US012693761B2

(12) United States Patent
Xu et al.

(10) Patent No.: US 12,693,761 B2
(45) Date of Patent: Jul. 28, 2026

(54) SCANNING CONTROL METHOD WITH SELECTION OF DRIVING CHANNELS ACCORDING TO TOUCH SIGNALS

(71) Applicant: SHENZHEN HITEVISION TECHNOLOGY CO., LTD., Shenzhen (CN)

(72) Inventors: Xiezeng Xu, Shenzhen (CN); Zhiyong Wang, Shenzhen (CN); Minghua Zhang, Shenzhen (CN); Shuai Wang, Shenzhen (CN)

(73) Assignee: SHENZHEN HITEVISION TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/981,700

(22) Filed: Dec. 16, 2024

(65) Prior Publication Data

US 2025/0117096 A1 Apr. 10, 2025

Related U.S. Application Data

(63) Continuation of application No. PCT/CN2023/087247, filed on Apr. 10, 2023.

(30) Foreign Application Priority Data

Nov. 11, 2022 (CN) .......................... 202211412679.6

(51) Int. Cl.
*G06F 3/041* (2006.01)
*G06F 3/044* (2006.01)
(52) U.S. Cl.
CPC ........ *G06F 3/04166* (2019.05); *G06F 3/0446* (2019.05)

(58) Field of Classification Search
CPC ........................... G06F 3/04166; G06F 3/0446
See application file for complete search history.

(56) References Cited

U.S. PATENT DOCUMENTS

2012/0154324 A1 6/2012 Wright et al.
2013/0229382 A1* 9/2013 Huang ................ G06F 3/04166
345/174

(Continued)

FOREIGN PATENT DOCUMENTS

CN 103455194 A 12/2013
CN 111666004 A 9/2020

(Continued)

OTHER PUBLICATIONS

The International search report for PCT Application No. PCT/CN2023/087247, dated May 23, 2023, 4 pages.

(Continued)

*Primary Examiner* — Liliana Cerullo
(74) *Attorney, Agent, or Firm* — East IP P.C.

(57) ABSTRACT

Embodiments of the present application provide a scanning control method and system for a touch display screen, a device, and a readable storage medium. The method comprises: determining a first driving channel where a touch signal is detected and N driving channels adjacent thereto as first to-be-scanned driving channels; selecting an unselected driving channel combination as second to-be-scanned driving channels; providing a touch driving signal to the first to-be-scanned driving channels and the second to-be-scanned driving channels and obtaining a touch signal; if a target driving channel where the touch signal is detected is inconsistent with the first driving channel, updating the target driving channel as the first driving channel; and if consistent, continuing to select an unselected driving channel combination as the second to-be-scanned driving chan- (Continued)

nels until there are no unselected driving channel combinations.

18 Claims, 8 Drawing Sheets

(56) References Cited

U.S. PATENT DOCUMENTS

| | | | |
|---|---|---|---|
| 2014/0028563 A1* | 1/2014 | Singh ................. | G06F 3/04166 |
| | | | 345/173 |
| 2015/0022463 A1* | 1/2015 | Kelso ................. | G06F 3/04184 |
| | | | 345/173 |
| 2015/0022486 A1 | 1/2015 | Li et al. | |
| 2016/0259467 A1* | 9/2016 | Nayyar ............. | G06F 3/041661 |
| 2022/0027047 A1* | 1/2022 | Morrison ............. | G06F 3/0446 |

FOREIGN PATENT DOCUMENTS

| | | |
|---|---|---|
| CN | 114442861 A | 5/2022 |
| CN | 115793879 A | 3/2023 |

OTHER PUBLICATIONS

The extended European search report dated Sep. 4, 2025 for European Application No. 23887360.8 , 13 pages.

* cited by examiner

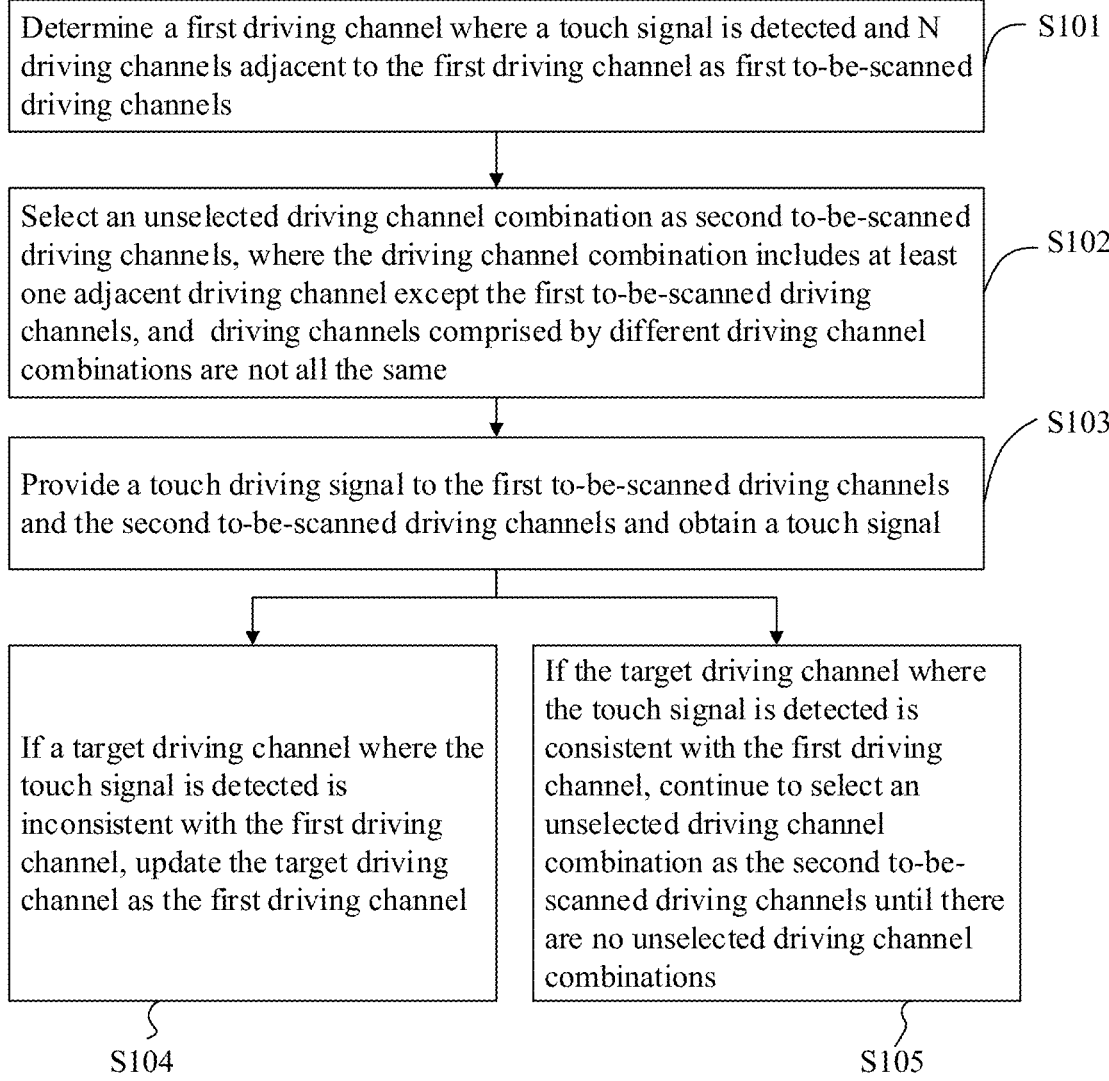

Determine a first driving channel where a touch signal is detected and N driving channels adjacent to the first driving channel as first to-be-scanned driving channels ⟋ S101

Select an unselected driving channel combination as second to-be-scanned driving channels, where the driving channel combination includes at least one adjacent driving channel except the first to-be-scanned driving channels, and driving channels comprised by different driving channel combinations are not all the same ⟋ S102

Provide a touch driving signal to the first to-be-scanned driving channels and the second to-be-scanned driving channels and obtain a touch signal ⟋ S103

If a target driving channel where the touch signal is detected is inconsistent with the first driving channel, update the target driving channel as the first driving channel

S104

If the target driving channel where the touch signal is detected is consistent with the first driving channel, continue to select an unselected driving channel combination as the second to-be-scanned driving channels until there are no unselected driving channel combinations

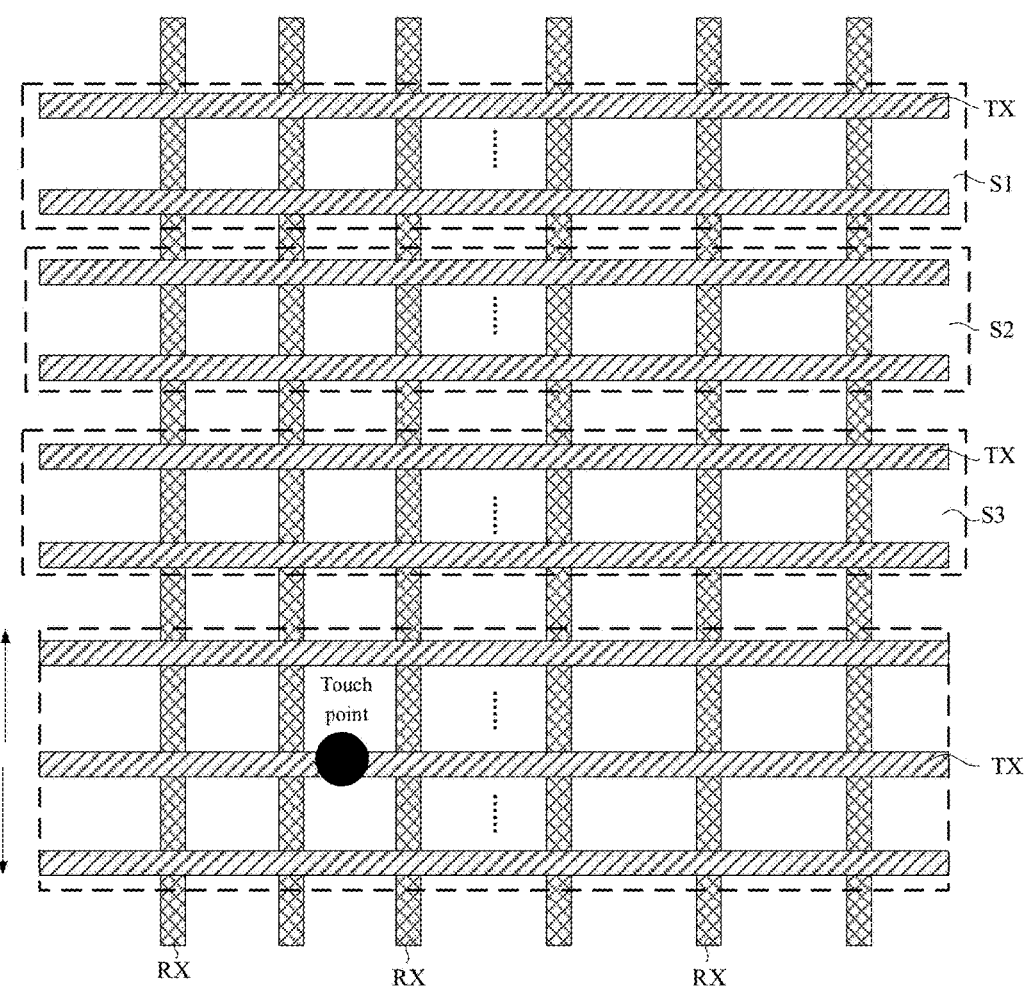

Fig. 3

| | |
|---|---|
| Divide the driving channels except the first to-be-scanned driving channels into a plurality of driving channel combinations in order of arrangement of the driving channels | S401 |
| Sequentially select an unselected driving channel combination as the second to-be-scanned driving channels in order of arrangement of the driving channel combinations | S402 |

Fig. 4

| | |
|---|---|
| Divide the driving channels except the first to-be-scanned driving channels into a plurality of driving channel combinations in ascending order of distances from the first to-be-scanned driving channels | S501 |
| Sequentially select an unselected driving channel combination as the second to-be-scanned driving channels in order of arrangement of the driving channel combinations | S502 |

Fig. 5

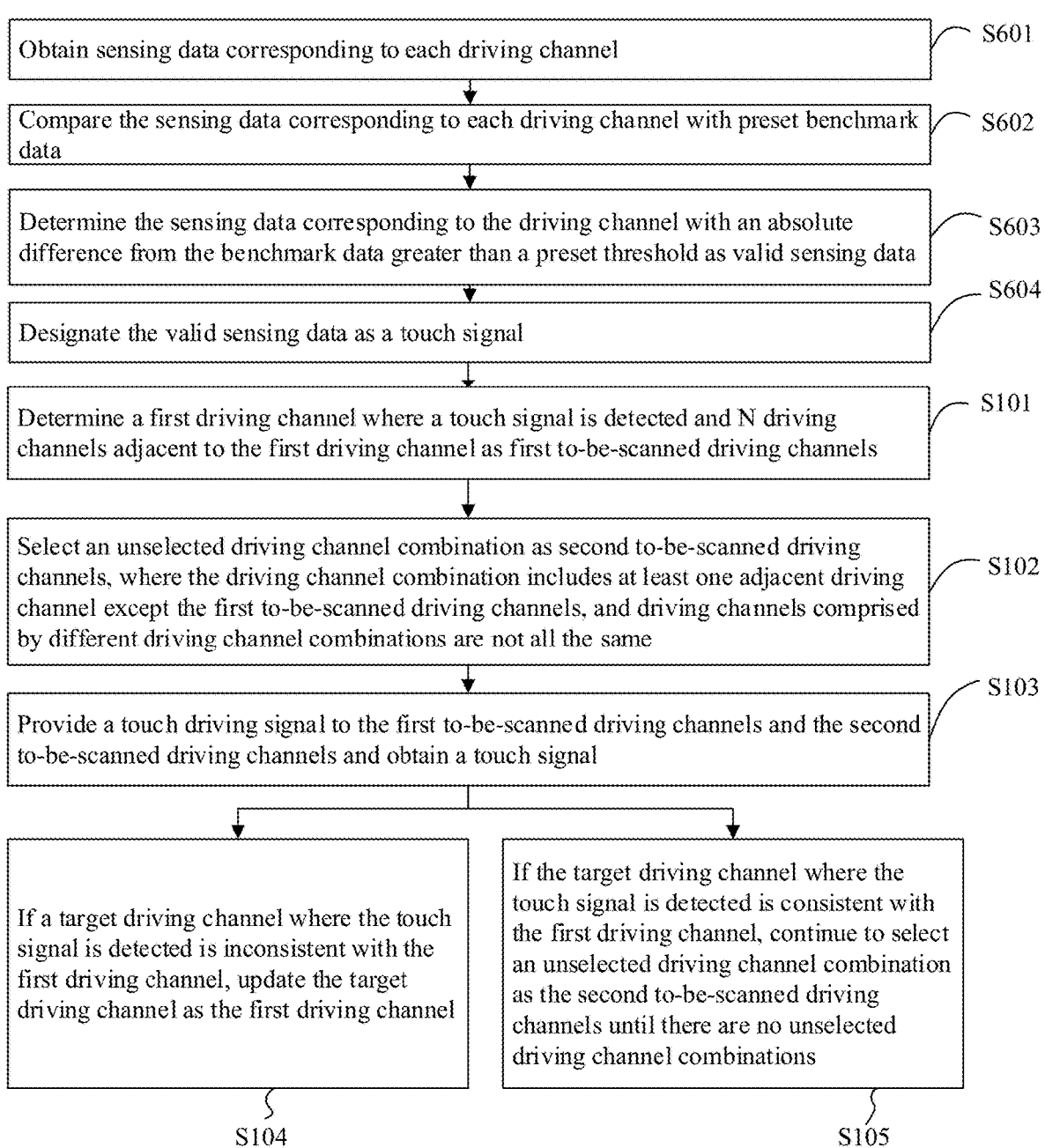

Obtain sensing data corresponding to each driving channel                    S601

Compare the sensing data corresponding to each driving channel with preset benchmark data                    S602

Determine the sensing data corresponding to the driving channel with an absolute difference from the benchmark data greater than a preset threshold as valid sensing data                    S603

Designate the valid sensing data as a touch signal                    S604

Determine a first driving channel where a touch signal is detected and N driving channels adjacent to the first driving channel as first to-be-scanned driving channels                    S101

Select an unselected driving channel combination as second to-be-scanned driving channels, where the driving channel combination includes at least one adjacent driving channel except the first to-be-scanned driving channels, and driving channels comprised by different driving channel combinations are not all the same                    S102

Provide a touch driving signal to the first to-be-scanned driving channels and the second to-be-scanned driving channels and obtain a touch signal                    S103

If a target driving channel where the touch signal is detected is inconsistent with the first driving channel, update the target driving channel as the first driving channel
S104

If the target driving channel where the touch signal is detected is consistent with the first driving channel, continue to select an unselected driving channel combination as the second to-be-scanned driving channels until there are no unselected driving channel combinations
S105

Fig. 6

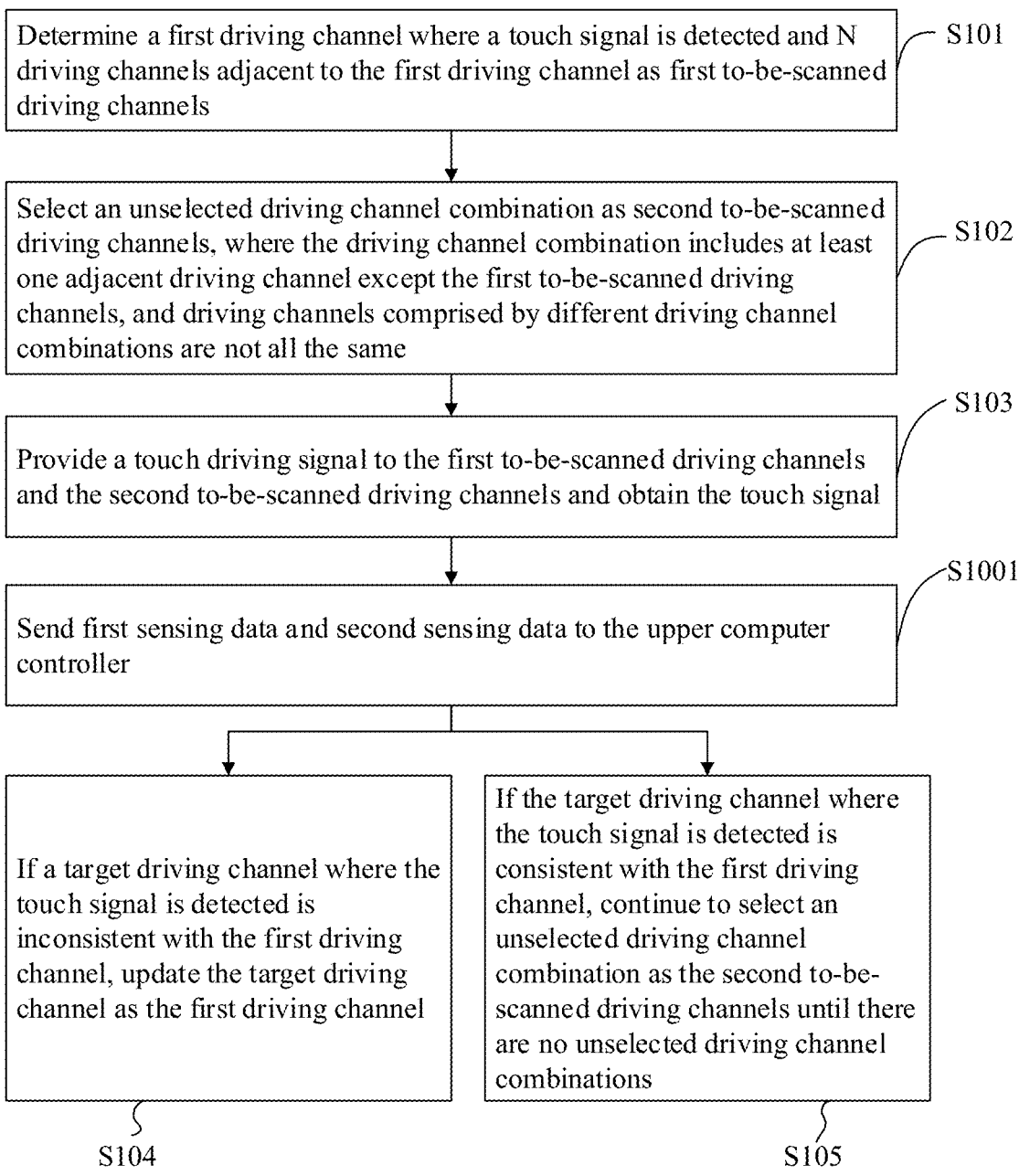

Determine a first driving channel where a touch signal is detected and N driving channels adjacent to the first driving channel as first to-be-scanned driving channels ⌐ S101

Select an unselected driving channel combination as second to-be-scanned driving channels, where the driving channel combination includes at least one adjacent driving channel except the first to-be-scanned driving channels, and driving channels comprised by different driving channel combinations are not all the same ⌐ S102

Provide a touch driving signal to the first to-be-scanned driving channels and the second to-be-scanned driving channels and obtain the touch signal ⌐ S103

Send first sensing data and second sensing data to the upper computer controller ⌐ S1001

If a target driving channel where the touch signal is detected is inconsistent with the first driving channel, update the target driving channel as the first driving channel

S104

If the target driving channel where the touch signal is detected is consistent with the first driving channel, continue to select an unselected driving channel combination as the second to-be-scanned driving channels until there are no unselected driving channel combinations

SCANNING CONTROL METHOD WITH SELECTION OF DRIVING CHANNELS ACCORDING TO TOUCH SIGNALS

CROSS REFERENCE TO RELATED APPLICATION

The present application is a continuation application of International Application No. PCT/CN2023/087247 filed on Apr. 10, 2023, which claims priority to Chinese Patent Application No. 202211412679.6, entitled "SCANNING CONTROL METHOD AND SYSTEM FOR TOUCH DISPLAY SCREEN, DEVICE, AND READABLE STORAGE MEDIUM" filed on Nov. 11, 2022, both of which are incorporated herein by reference in their entireties.

TECHNICAL FIELD

The present application belongs to the field of touch technology, and in particular, relates to a scanning control method and system for a touch display screen, a device, and a readable storage medium.

BACKGROUND

As an important component of human-computer interaction, touch display screens have been widely used at present in electronic products such as mobile phones and interactive tablets.

SUMMARY

In a first aspect, embodiments of the present application provide a scanning control method for a touch display screen, the touch display screen including a plurality of driving channels, the scanning control method for the touch display screen including: determining a first driving channel where a touch signal is detected and N driving channels adjacent to the first driving channel as first to-be-scanned driving channels, where the first driving channel is any one or more driving channels among the plurality of driving channels, and N is a positive integer; selecting an unselected driving channel combination as second to-be-scanned driving channels, where the driving channel combination includes at least one adjacent driving channel except the first to-be-scanned driving channels, and driving channels comprised by different driving channel combinations are not all the same; providing a touch driving signal to the first to-be-scanned driving channels and the second to-be-scanned driving channels and obtaining a touch signal; if a target driving channel where the touch signal is detected is inconsistent with the first driving channel, updating the target driving channel as the first driving channel; and if the target driving channel where the touch signal is detected is consistent with the first driving channel, continuing to select an unselected driving channel combination as the second to-be-scanned driving channels until there are no unselected driving channel combinations.

According to embodiments of the first aspect of the present application, the selecting an unselected driving channel combination as second to-be-scanned driving channels includes: sequentially selecting an unselected driving channel combination as the second to-be-scanned driving channels in order of arrangement of the driving channels.

According to embodiments of the first aspect of the present application, different driving channel combinations each comprise the same number of driving channels; the sequentially selecting an unselected driving channel combination as the second to-be-scanned driving channels in order of arrangement of the driving channels includes: dividing the driving channels except the first to-be-scanned driving channels into a plurality of driving channel combinations in order of arrangement of the driving channels; and sequentially selecting an unselected driving channel combination as the second to-be-scanned driving channels in order of arrangement of the driving channel combinations.

According to embodiments of the first aspect of the present application, if the target driving channel where the touch signal is detected is consistent with the first driving channel, the continuing to select an unselected driving channel combination as the second to-be-scanned driving channels until there are no unselected driving channel combinations includes: if the target driving channel where the touch signal is detected is consistent with the first driving channel, continuing to select an unselected driving channel combination as the second to-be-scanned driving channels until the driving channel combination includes the last driving channel.

According to embodiments of the first aspect of the present application, the selecting an unselected driving channel combination as second to-be-scanned driving channels includes: dividing the driving channels except the first to-be-scanned driving channels into a plurality of driving channel combinations in ascending order of distances from the first to-be-scanned driving channels; and sequentially selecting an unselected driving channel combination as the second to-be-scanned driving channels in order of arrangement of the driving channel combinations.

According to embodiments of the first aspect of the present application, before determining a first driving channel where a touch signal is detected and N driving channels adjacent to the first driving channel as first to-be-scanned driving channels, the method further includes: obtaining sensing data corresponding to each driving channel; comparing the sensing data corresponding to each driving channel with preset benchmark data; determining the sensing data corresponding to the driving channel with an absolute difference from the benchmark data greater than a preset threshold as valid sensing data; and designating the valid sensing data as a touch signal.

In a second aspect, embodiments of the present application provide a scanning control system for a touch display screen, including: a driving unit; and a touch motherboard controller, where the touch motherboard controller is electrically connected to a plurality of driving channels through the driving unit, and the touch motherboard controller is configured to perform the scanning control method for the touch display screen as provided in the first aspect.

In a third aspect, embodiments of the present application provide a touch display device, including: a processor, a memory, and a computer program stored in the memory and executable on the processor, where the computer program, when executed by the processor, causes the steps of the scanning control method for the touch display screen as provided in the first aspect to be implemented.

In a fourth aspect, embodiments of the present application provide a computer-readable storage medium, storing a computer program that, when executed by a processor, causes the steps of the scanning control method for the touch display screen as provided in the first aspect to be implemented.

BRIEF DESCRIPTION OF THE DRAWINGS

In order to explain the technical solutions of embodiments of the present application more clearly, the accompanying drawings required for use in embodiments of the present application will be briefly introduced below. Those of ordinary skill in the art can derive other drawings based on the accompanying drawings without any creative effort.

FIG. 2 is a schematic flowchart of a scanning control method for a touch display screen provided in an embodiment of the present application;

FIG. 3 is an operation view of the scanning control method for the touch display screen provided in an embodiment of the present application;

FIG. 4 is a schematic flowchart of S102 in the scanning control method for the touch display screen provided in an embodiment of the present application;

FIG. 5 is another schematic flowchart of S102 in the scanning control method for the touch display screen provided in an embodiment of the present application;

FIG. 6 is another schematic flowchart of the scanning control method for the touch display screen provided in an embodiment of the present application;

FIG. 10 is another schematic flowchart of the scanning control method for the touch display screen provided in an embodiment of the present application;

DETAILED DESCRIPTION

Figure 1:
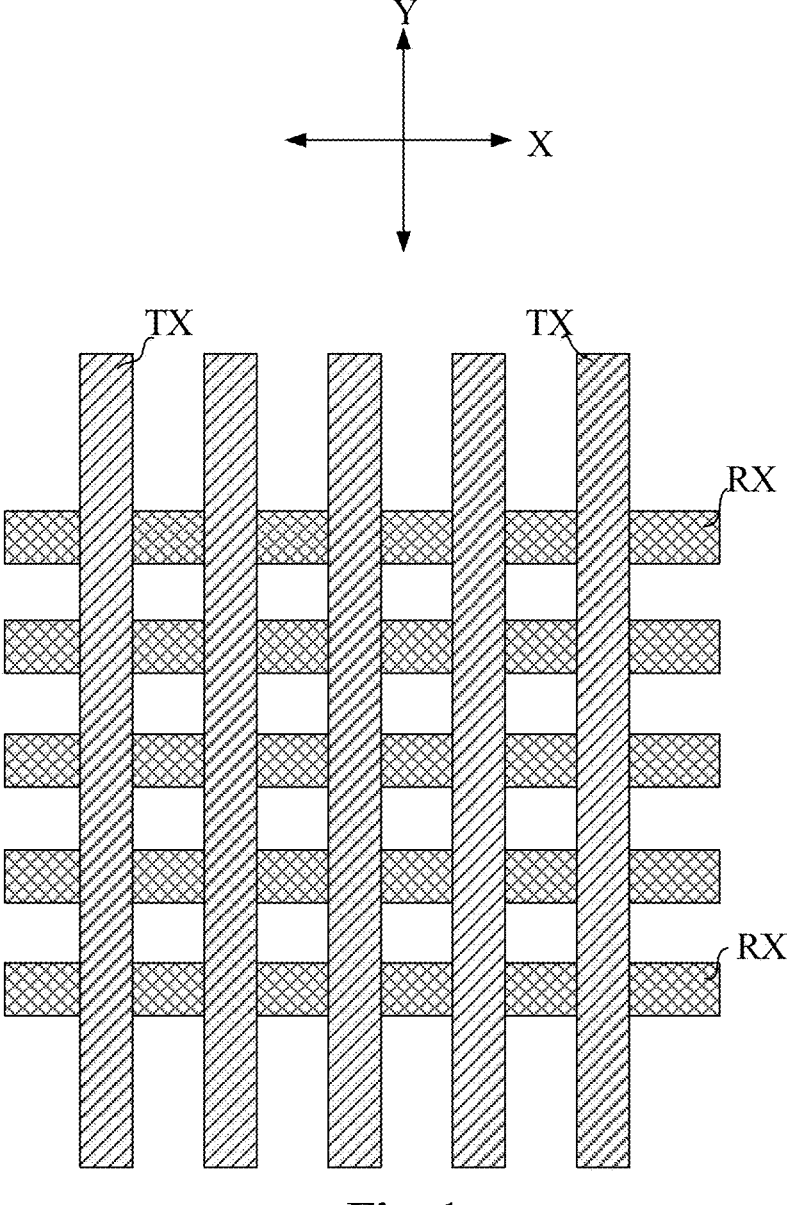
FIG. 1 is a schematic structural view of a mutual capacitive touch screen.

Features and exemplary embodiments of various aspects of the present application will be described in detail below. In order to make the objectives, technical solutions, and advantages of the present application clearer, the present application will be further described in detail below with reference to the accompanying drawings and specific embodiments. It should be understood that the specific embodiments described here are only intended to explain the present application, but not to limit the present application. For those skilled in the art, the present application can be implemented without some of these specific details. The following descriptions of embodiments are merely for providing a better understanding of the present invention by showing examples of the present invention.

It should be noted that the relational terms herein, such as first and second, are merely used for distinguishing one entity or operation from another, and do not necessarily require or imply that any actual relationship or sequence exists between these entities or operations. Moreover, the terms "include", "comprise", and any variants thereof are intended to cover a non-exclusive inclusion, so that a process, method, article, or device including a series of elements not only includes those elements, but further includes other elements not listed explicitly, or includes inherent elements of the process, method, article, or device.

In the absence of more limitations, an element defined by "include a . . . " does not exclude other same elements existing in the process, method, article, or device including the element.

Understandably, the term "and/or" used below is only an associative relationship for describing associated objects, indicating three relationships. For example, A and/or B may indicate three situations: A exists alone; A and B exist at the same time; and B exists alone. In addition, the character "/" herein generally indicates an "or" relationship between contextually associated objects.

In embodiments of the present application, the term "electrically connected" may refer to direct electrical connection between two components, or electrical connection between two components by one or more other components.

It is obvious to those skilled in the art that various modifications and changes can be made in the present application without departing from the gist or scope of the present application. Therefore, the present application is intended to cover the modifications and variations of the present application that fall within the scope of the corresponding claims (technical solutions to be protected) and equivalents thereof. It should be noted that the implementations provided in embodiments of the present application can be combined with each other without contradiction.

Before elaborating on the technical solutions provided in embodiments of the present application, in order to facilitate the understanding of embodiments of the present application, the present application first provides a specific explanation of the problems existing in related technologies:

According to different touch principles, touch display screens may be classified into resistive touch screens, capacitive touch screens, infrared touch screens, acoustic touch screens, optical imaging touch screens, electromagnetic induction touch screens, etc. Among them, the capacitive touch screens may include self-capacitive touch screens and mutual capacitive touch screens. FIG. 1 is a schematic structural view of a mutual capacitive touch screen. As shown in FIG. 1, the capacitive touch screen includes a plurality of driving channels TX arranged sequentially in a first direction X and a plurality of receiving channels RX arranged sequentially in a second direction Y, and the first direction X intersects with the second direction Y, that is, the driving channels TX intersect with the receiving channels RX, to form a plurality of mutual capacitive sensing nodes. A scanning method used therefor is as follows: in the scanning of each frame, touch driving signals are sequentially sent to the plurality of driving channels TX, and some or all of the plurality of receiving channels RX receive signals simultaneously, which can ensure that the capacitive touch screen can detect the touch position after the scanning of each frame when a touch event occurs at any position.

The inventor of the present application found by research that, for a touch display screen, especially for a large-sized touch display screen (such as a 86-inch touch display screen) with a large touch area, in order to ensure touch accuracy, the touch display screen needs a lot of receiving channels and transmitting channels and needs to collect and process mass capacitive sensing data, making it difficult to achieve a high frame rate (such as 300 frames/second or more). Therefore, the response speed of the touch display screen is limited, which affects user experience.

In view of the above research findings of the inventor, embodiments of the present application provide a scanning control method and system for a touch display screen, a device, and a readable storage medium, which can solve the technical problems of low scanning frame rate and response speed and poor user experience of touch display screens in related technologies.

The technical concept of embodiments of the present application is as follows: the scanning method of the touch display screen is changed from full area scanning to dynamic scanning, that is, only a first driving channel with a touch signal and N driving channels adjacent to the first driving channel (namely, first to-be-scanned driving channels) are scanned, an unselected driving channel combination is selected as second to-be-scanned driving channels, and the remaining driving channels in the touch display screen except the first to-be-scanned driving channels are scanned in rounds, thereby shortening scanning time for the touch display screen in each frame, reducing scanning data for the touch display screen in each frame, improving the scanning frame rate and response speed of the touch display screen, and enhancing user experience.

Hereinafter, the scanning control method for the touch display screen provided in embodiments of the present application is first introduced. As shown in FIG. 1, the touch display screen in embodiments of the present application may be a mutual capacitive touch screen, which may include a plurality of driving channels TX.

FIG. 2 is a schematic flowchart of a scanning control method for a touch display screen provided in an embodiment of the present application. As shown in FIG. 2, the scanning control method for the touch display screen provided in embodiment of the present application may include the following steps S101 to S105.

S101: Determine a first driving channel where a touch signal is detected and N driving channels adjacent to the first driving channel as first to-be-scanned driving channels. The first driving channel is any one or more driving channels among a plurality of driving channels, and N is a positive integer.

Notably, in some examples, the plurality of driving channels TX in the touch display screen may be arranged sequentially in a row direction of the touch display screen, and the plurality of receiving channels RX in the touch display screen may be arranged sequentially in a column direction of the touch display screen. Correspondingly, when the plurality of driving channels TX are arranged sequentially in the row direction, the N driving channels adjacent to the first driving channel may simultaneously include N driving channels adjacent to a left side of the first driving channel and N driving channels adjacent to a right side of the first driving channel.

FIG. 3 is an operation view of the scanning control method for the touch display screen provided in an embodiment of the present application. As shown in FIG. 3, in other examples, the plurality of driving channels TX in the touch display screen may be arranged sequentially in the column direction of the touch display screen, and the plurality of receiving channels RX in the touch display screen may be arranged sequentially in the row direction of the touch display screen. Correspondingly, when the plurality of driving channels TX are arranged sequentially in the column direction, the N driving channels adjacent to the first driving channel may simultaneously include N driving channels adjacent to an upper side of the first driving channel and N driving channels adjacent to a lower side of the first driving channel.

In embodiments of the present application, on the basis of the first driving channel, expanding the N driving channels adjacent to the first driving channel as the first to-be-scanned driving channels corresponding to the scanning of next frame has the following advantage: if a touch object continuously touches the touch display screen, expanding the N driving channels adjacent to the first driving channel as the first to-be-scanned driving channels, namely, increasing the touch area, can greatly ensure that the touch signal can be detected during the scanning of next frame and ensure the accuracy of touch detection.

Notably, in some examples, the first driving channels may include at least two driving channels, such as a $p^{th}$ driving channel and a $q^{th}$ driving channel, where $p \neq q$ and both p and q are positive integers. When the $p^{th}$ driving channel and the $q^{th}$ driving channel are relatively close, the N driving channels adjacent to the $p^{th}$ driving channel may overlap with the N driving channels adjacent to the $q^{th}$ driving channel. Then, in S101, the N driving channels adjacent to all the first driving channels can be sorted to remove redundant driving channels, thereby ensuring that any two driving channels among the finally obtained first to-be-scanned driving channels do not overlap with each other.

It should be noted that the specific value of N can be flexibly adjusted according to the actual situation, such as N=8, and is not limited in embodiments of the present application.

S102: Select an unselected driving channel combination as second to-be-scanned driving channels, where the driving channel combination includes at least one adjacent driving channel except the first to-be-scanned driving channels, and driving channels comprised by different driving channel combinations are not all the same.

As shown in FIG. 3, the remaining driving channels in the touch display screen except the first to-be-scanned driving channels can be divided into a plurality of different driving channel combinations, such as driving channel combinations S1 to Sn. Each driving channel combination may include at least one driving channel. Driving channels comprised by different driving channel combinations are not all the same. That is, at least one driving channel in different driving channel combination is different. In S102, an unselected driving channel combination (such as driving channel combination S1) may be selected as second to-be-scanned driving channels.

For example, during the scanning of an $i^{th}$ frame, the driving channel combination S1 may be selected as second to-be-scanned driving channels corresponding to the scanning of an $(i+1)^{th}$ frame. During the scanning of the $(i+1)^{th}$ frame, the driving channel combination S2 may be selected as second to-be-scanned driving channels corresponding to the scanning of an $(i+2)^{th}$ frame. During the scanning of the $(i+2)^{th}$ frame, the driving channel combination S3 may be selected as second to-be-scanned driving channels corresponding to the scanning of an $(i+3)^{th}$ frame. The driving channel combination S3, the driving channel combination S2, and the driving channel combination S1 do not overlap at least partially. The process is repeated, so as to scan almost all the remaining driving channels in the touch display screen except the first to-be-scanned driving channels in n frames.

In embodiments of the present application, selecting the unselected driving channel combination as the second to-be-scanned driving channel has the advantages of ensuring that a touch point can be detected from an untouched area (namely, an area except the first to-be-scanned driving channel) in the first time, and better ensuring that the touch point can be quickly and accurately detected when falling into the untouched area in the current frame within n frames after the current frame, thereby effectively avoiding missed detection.

S103: Provide a touch driving signal to the first to-be-scanned driving channels and the second to-be-scanned driving channels and obtain a touch signal.

In S103, the touch driving signal may be provided to the first to-be-scanned driving channels and the second to-be-scanned driving channels, and the touch signal fed back from the touch display screen may be obtained.

S104: If a target driving channel where the touch signal is detected is inconsistent with the first driving channel, update the target driving channel as the first driving channel.

That is, if the target driving channel where the touch signal is detected in the next frame is inconsistent with the first driving channel where the touch signal is detected in the previous frame, it indicates that the touch position has changed, the target driving channel where touch signal is detected in the next frame can be updated to the first driving channel of the next frame, and step S101 can be returned.

S105: If the target driving channel where the touch signal is detected is consistent with the first driving channel, continue to select an unselected driving channel combination as the second to-be-scanned driving channels until there are no unselected driving channel combinations.

That is, if the target driving channel where the touch signal is detected in the next frame is consistent with the first driving channel where the touch signal is detected in the previous frame, it indicates that the touch position has not changed, and an unselected driving channel combination is further selected as second to-be-scanned driving channels. For example, if the driving channel combination S1 is selected in the previous frame as second to-be-scanned driving channels, the driving channel combination S2 may be selected in the next frame as second to-be-scanned driving channels until there are no unselected driving channel combinations. That is, the remaining driving channels in the touch display screen except the first to-be-scanned driving channels are scanned in rounds.

According to the scanning control method and system for the touch display screen, the device, and the readable storage medium in embodiments of the present application, full area scanning of the touch display screen is changed to dynamic scanning, that is, only the first driving channel with the touch signal and the N driving channels adjacent to the first driving channel (namely, the first to-be-scanned driving channels) are scanned, an unselected driving channel combination is selected as second to-be-scanned driving channels, and the remaining driving channels in the touch display screen except the first to-be-scanned driving channels are scanned in rounds, thereby shortening scanning time for the touch display screen in each frame, reducing scanning data for the touch display screen in each frame, improving the scanning frame rate and response speed of the touch display screen, and enhancing user experience.

According to some embodiments of the present application, optionally, S102 of selecting unselected driving channel combination as second to-be-scanned driving channels may include the following steps:

sequentially selecting an unselected driving channel combination as the second to-be-scanned driving channels in order of arrangement of the driving channels.

For example, when the plurality of driving channels TX in the touch display screen are arranged sequentially in the row direction of the touch display screen, as shown in FIG. 3, an unselected driving channel combination can be sequentially selected as second to-be-scanned driving channels in order of the driving channels arranged from top to bottom or from bottom to top.

For another example, when the plurality of driving channels TX in the touch display screen are arranged sequentially in the column direction of the touch display screen, an unselected driving channel combination can be sequentially selected as second to-be-scanned driving channels in order of the driving channels arranged from left to right or from right to left.

In this way, an unselected driving channel combination is sequentially selected as second to-be-scanned driving channels in the order of arrangement of the driving channels, which can sequentially scan each driving channel where the touch signal is not detected to avoid missing one or more driving channels in one or more driving channel combinations.

According to some embodiments of the present application, optionally, different driving channel combinations may include the same number of driving channels. That is, each driving channel combination may include M driving channels, where M is a positive integer.

FIG. 4 is a schematic flowchart of S102 in the scanning control method for the touch display screen provided in an embodiment of the present application. As shown in FIG. 4, S102 of sequentially selecting an unselected driving channel combination as the second to-be-scanned driving channels in order of arrangement of the driving channels may include the following steps S401 and S402.

S401: Divide the driving channels except the first to-be-scanned driving channels into a plurality of driving channel combinations in the order of arrangement of the driving channels.

For example, the touch display screen has a total of 100 driving channels, of which the first to-be-scanned driving channels include 10 driving channels. Then, the 90 driving channels except the first to-be-scanned driving channels may be divided into a plurality of driving channel combinations in the order of arrangement of the driving channels. For example, if a driving channel combination may include 10 driving channels, the 90 driving channels may be divided into 9 driving channel combinations.

S402: Sequentially select an unselected driving channel combination as the second to-be-scanned driving channels in order of arrangement of the driving channel combinations.

It can be understood that the driving channel combinations may also be arranged in the same order of arrangement of the driving channels, such as from top to bottom. In S402, an unselected driving channel combination may be selected as second to-be-scanned driving channels in the order of arrangement of the driving channels.

For example, during the scanning of an $i^{th}$ frame, the driving channel combination S1 may be selected as second to-be-scanned driving channels corresponding to the scanning of an $(i+1)^{th}$ frame. During the scanning of the $(i+1)^{th}$ frame, the driving channel combination S2 may be selected as second to-be-scanned driving channels corresponding to the scanning of an $(i+2)^{th}$ frame. During the scanning of the $(i+2)^{th}$ frame, the driving channel combination S3 may be selected as second to-be-scanned driving channels corresponding to the scanning of an $(i+3)^{th}$ frame.

In this way, an unselected driving channel combination is sequentially selected as second to-be-scanned driving channels in the order of arrangement of driving channel combinations, which can sequentially scan each driving channel where the touch signal is not detected to avoid missing one or more driving channels in one or more driving channel combinations.

According to some embodiments of the present applications, optionally, in S105, if the target driving channel where the touch signal is detected is consistent with the first driving channel, continuing to select an unselected driving channel combination as the second to-be-scanned driving channels until there are no unselected driving channel combinations may include the following step:

if the target driving channel where the touch signal is detected is consistent with the first driving channel, continuing to select an unselected driving channel combination as the second to-be-scanned driving channels until the driving channel combination includes the last driving channel.

That is, in some embodiments, when second to-be-scanned driving channels include the last driving channel of the touch display screen, it indicates that the last driving channel has been scanned, the current scanning cycle can be ended, and the next scanning cycle can be started. That is, the first driving channel of the touch display screen is returned and the next scanning process is started.

FIG. 5 is another schematic flowchart of S102 in the scanning control method for the touch display screen provided in an embodiment of the present application. As shown in FIG. 5, different from the embodiment shown in FIG. 4, according to other embodiments of the present application, optionally, S102 of selecting unselected driving channel combination as second to-be-scanned driving channels may include the following steps S501 and S502.

S501: Divide the driving channels except the first to-be-scanned driving channels into a plurality of driving channel combinations in ascending order of distances from the first to-be-scanned driving channels.

For example, according to the distances from the first to-be-scanned driving channels, the $1^{st}$ to $5^{th}$ driving channels from the first to-be-scanned driving channels are used as a first driving channel combination, the $6^{th}$ to $10^{th}$ driving channels from the first to-be-scanned driving channels are used as a second driving channel combination, the $11^{th}$ to $15^{th}$ driving channels from the first to-be-scanned driving channels are used as a third driving channel combination, and so on.

S502: Sequentially select an unselected driving channel combination as the second to-be-scanned driving channels in order of arrangement of the driving channel combinations. In S502, for example, an unselected driving channel combination may be sequentially selected as second to-be-scanned driving channels in ascending order or descending order of distances from the first to-be-scanned driving channels.

In this way, an unselected driving channel combination is sequentially selected as second to-be-scanned driving channels in the order of arrangement of driving channel combinations, which can sequentially scan each driving channel where the touch signal is not detected to avoid missing one or more driving channels in one or more driving channel combinations.

In some specific embodiments, the number of driving channels included in different driving channel combinations may sequentially increase in the order of arrangement of the driving channel combinations. For example, according to the distances from the first to-be-scanned driving channels, the $1^{st}$ to $3^{rd}$ driving channels from the first to-be-scanned driving channels are used as a first driving channel combination, the $4^{th}$ to $8^{th}$ driving channels from the first to-bescanned driving channels are used as a second driving channel combination, the $9^{th}$ to $15^{th}$ driving channels from the first to-be-scanned driving channels are used as a third driving channel combination, and so on. That is, the farther from the first to-be-scanned driving channels, the more driving channels in the driving channel combinations.

In different driving channel combinations, the second driving channel combination may include at least some of the driving channels in the first driving channel combination, namely, the driving channels in the second driving channel combination may overlap at least partially with the driving channels in the first driving channel combination. The first driving channel combination and the second driving channel combination may be different driving channel combinations. The second driving channel combination is adjacent to the first driving channel combination, and the second driving channel combination is behind the first driving channel combination.

In this way, the driving channels in the driving channel combinations farther from the first to-be-scanned driving channels can be quickly scanned in rounds, that is, more driving channels can be scanned once, and the driving channels in the driving channel combinations closer to the first to-be-scanned driving channels can be accurately scanned in rounds, that is, a fewer driving channels can be scanned once, thereby improving scanning speed and ensuring high scanning accuracy.

FIG. 6 is another schematic flowchart of the scanning control method for the touch display screen provided in an embodiment of the present application. As shown in FIG. 6, according to some embodiments of the present application, optionally, before S101 of determining a first driving channel where a touch signal is detected and N driving channels adjacent to the first driving channel as first to-be-scanned driving channels, the method may further include the following steps S601 to S604.

S601: Obtain sensing data corresponding to each driving channel.

The touch display screen may include a plurality of receiving channels RX, which intersect with and are insulated from the plurality of driving channels TX. Each driving channel TX may overlap with a plurality of receiving channels RX. Each driving channel TX can receive sensing data from the plurality of receiving channels RX corresponding to the driving channel TX, so one driving channel can correspond to the sensing data from the plurality of receiving channels. In S601, the sensing data of the plurality of receiving channels corresponding to each driving channel can be obtained.

S602: Compare the sensing data corresponding to each driving channel with preset benchmark data.

The sensing data corresponding to each driving channel may be compared with the preset benchmark data to determine whether the sensing data corresponding to each driving channel is greater than the preset benchmark data. The benchmark data may be determined according to the sensing data of the receiving channels RX when not touched. The preset threshold may be flexibly adjusted according to the actual situation, and is not limited by embodiments of the present application.

S603: Determine the sensing data corresponding to the driving channel with an absolute difference from the benchmark data greater than a preset threshold as valid sensing data.

If the absolute difference between the sensing data corresponding to a driving channel and the benchmark data is greater than the preset threshold, it indicates that the driving channel is touched, and the sensing data corresponding to the driving channel is determined as valid sensing data (or touch data).

S604: Designate the valid sensing data as a touch signal. That is, when the sensing data corresponding to a driving channel are valid sensing data, it indicates that there is the touch signal on the driving channel.

S101 of determining a first driving channel where a touch signal is detected and N driving channels adjacent to the first driving channel as first to-be-scanned driving channels may specifically include:

marking the driving channel where the valid sensing data is located, such as marking 1; and then expanding the marked driving channel, such as expanding two sides of all the driving channels marked 1 by N driving channels, to obtain the first to-be-scanned driving channels.

In this way, the driving channels where the touch signal is located can be accurately determined.

According to some embodiments of the present application, optionally, S103 of providing a touch driving signal to the first to-be-scanned driving channels and the second to-be-scanned driving channels may include the following steps.

In S103, a starting driving channel and an ending driving channel of the first to-be-scanned driving channels may be set, as well as a starting driving channel and an ending driving channel of the second to-be-scanned driving channels may be set. According to the starting driving channel and ending driving channel of the first to-be-scanned driving channels, a driving unit scans the first to-be-scanned driving channels. According to the starting driving channel and ending driving channel of the second to-be-scanned driving channels, the driving unit scans the second to-be-scanned driving channels.

Notably, if the first to-be-scanned driving channels are adjacent to the second to-be-scanned driving channels (namely, there is no gap between the first to-be-scanned driving channels and the second to-be-scanned driving channels), the first to-be-scanned driving channels and the second to-be-scanned driving channels may be regarded as a whole, so only one starting driving channel and one ending driving channel are set to further improve the scanning speed.

In embodiments of the present application, the process of determining the first to-be-scanned driving channels and the second to-be-scanned driving channels in the $(i+1)^{th}$ frame may be performed simultaneously during the scanning of the $i^{th}$ frame. After the scanning of the $i^{th}$ frame is completed, the scanning of the $(i+1)^{th}$ frame can be performed immediately without waiting, which does not affect the collection time of each frame and can further improve the scanning frame rate and response speed of the touch display screen.

Figure 7:
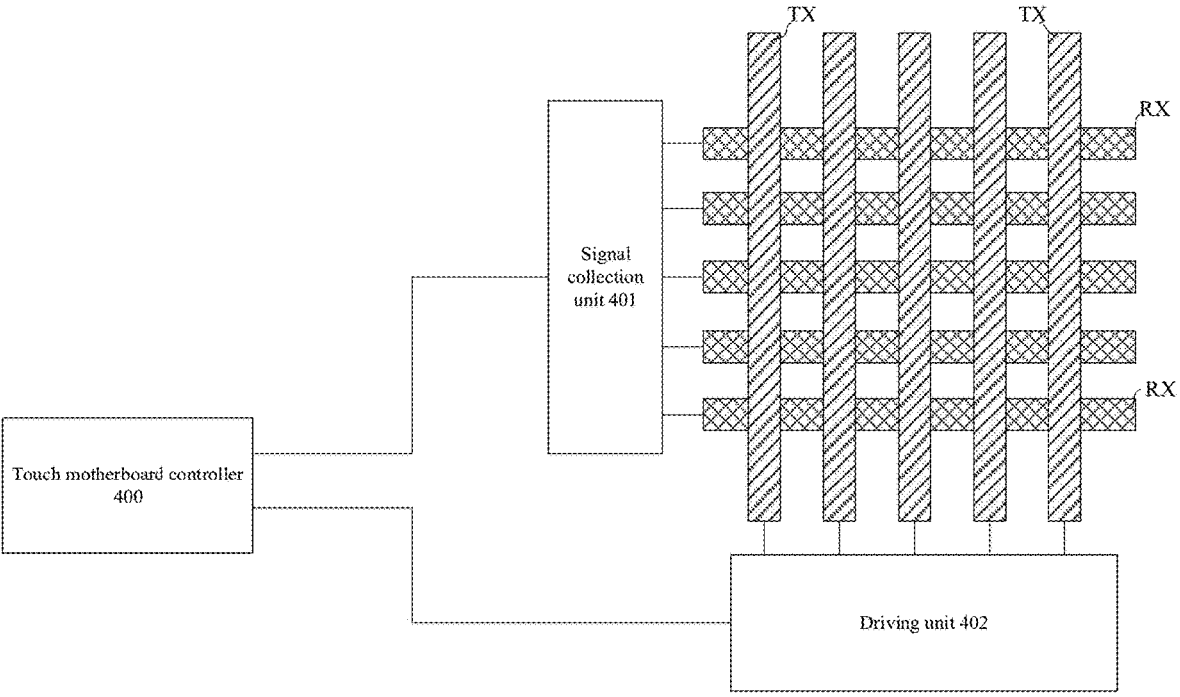
FIG. 7 is a schematic view of a circuit connection of the touch display screen provided in an embodiment of the present application.

FIG. 7 is a schematic view of circuit connection of the touch display screen provided in an embodiment of the present application. As shown in FIG. 7, according to some embodiments of the present application, optionally, the plurality of receiving channels RX may be electrically connected to a touch motherboard controller 400 through a signal collection unit 401, and the signal collection unit 401 may be configured to collect sensing data of the plurality of receiving channels RX. The plurality of driving channels TX may be electrically connected to the touch motherboard controller 400 through a driving unit 402, and the driving unit 402 may be used for providing a touch driving signal to the driving channels TX. In practical applications, the touch motherboard controller 400 may be, for example, a microcontroller unit (MCU); the signal collection unit 401 may be, for example, a signal collection chip; and the driving unit 402 may be, for example, a driving chip. The touch motherboard controller 400 may send trigger signals and interrupt signals to the driving unit 402 to control a scanning process. The steps in the scanning control method for the touch display screen provided in embodiments of the present application may be performed by the touch motherboard controller 400.

Figure 8:
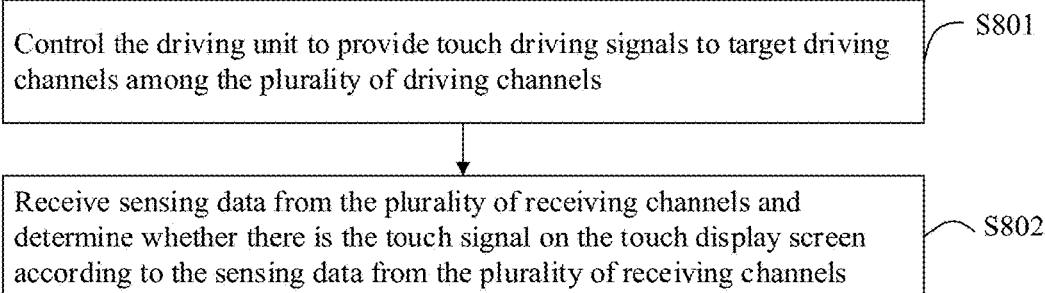
FIG. 8 is another schematic flowchart of step S101 in the scanning control method for the touch display screen provided in an embodiment of the present application.

FIG. 8 is another schematic flowchart of the scanning control method for the touch display screen provided in an embodiment of the present application. Correspondingly, in some embodiments, the following steps S801 and S802 may be included to determine whether there is the touch signal on the touch display screen.

S801: Control the driving unit to provide a touch driving signal to target driving channels among the plurality of driving channels.

In S801, at least some of the driving channels in the touch display screen may be selected as the target driving channels. The touch motherboard controller 400 sets a starting driving channel and an ending driving channel of the target driving channels to be scanned by the driving unit 402. The driving unit 402 sequentially provides the touch driving signal to each driving channel among the target driving channels according to the set starting driving channel and ending driving channel of the target driving channels.

S802: Receive sensing data from the plurality of receiving channels and determine whether there is the touch signal on the touch display screen according to the sensing data from the plurality of receiving channels.

In S802, the touch motherboard controller 400 receives the sensing data collected by the signal collection unit 401 from the plurality of receiving channels corresponding to each driving channel. Then, whether there is the touch signal on the touch display screen are determined according to the sensing data from the plurality of receiving channels corresponding to each driving channel. The specific process is described above and will not be repeated here.

In embodiments of the present application, the signal collection unit 401 and the driving unit 402 are independent of each other. After startup, the signal collection unit 401 and the driving unit 402 can operate autonomously in the absence of the participation of the touch motherboard controller 400 except for transmitting the sensing data, which can reduce the occupation of computing resources of the touch motherboard controller 400 and improve processing speed. Moreover, the driving unit 402 can set any driving channel or continuous channel area in real time for scanning, thereby achieving flexible and dynamic scanning.

According to some embodiments of the present application, optionally, the signal collection unit 401 may include at least two collection processors (not shown), different collection processors may be electrically connected to different receiving channels among the plurality of receiving channels, and the collection processors are used for collect sensing data from the receiving channels.

Correspondingly, S802 of receiving sensing data from the plurality of receiving channels may include the following step: simultaneously receiving sensing data sent by the at least two collection processors from at least two receiving channels.

Specifically, the signal collection unit 401 may include a plurality of collection processors that can simultaneously collect sensing data from the plurality of receiving channels and transmit the sensing data from the plurality of receiving channels to the touch motherboard controller 400, and the touch motherboard controller 400 simultaneously receives the sensing data from the plurality of receiving channels, thereby achieving parallel transmission of the sensing data from the receiving channels, significantly reducing the collection time for the sensing data, and further improving the scanning frame rate and response speed of the touch display screen.

According to some embodiments of the present application, optionally, the collection processor may be electrically connected to the touch motherboard controller through a first serial peripheral interface (SPI). For example, the signal collection unit 401 includes two collection processors, where the first collection processor may be electrically connected to the touch motherboard controller through a SPI 1, and the second collection processor may be electrically connected to the touch motherboard controller through a SPI 2. Optionally, the collection processor may use a direct memory access (dma) mode of the SPI to send the sensing data from the receiving channels to the touch motherboard controller.

Correspondingly, S802 of receiving sensing data from the plurality of receiving channels may include the following steps: receiving the sensing data from the receiving channels sent by the collection processor to the touch motherboard controller in the dma mode. The touch motherboard controller 400 may receive the sensing data from the receiving channels sent by the collection processor to the touch motherboard controller in the dma mode.

The dma mode is a data exchange mode that directly accesses data from a memory without going through the touch motherboard controller 400. In the dma mode, the touch motherboard controller 400 only needs to issue instructions to a DMA controller to handle data transfer. After the data transfer is completed, information is fed back to the touch motherboard controller 400, which alleviates resource occupation of the touch motherboard controller 400 to a great extent and can greatly save system resources.

According to some embodiments of the present application, optionally, the driving unit 402 may be electrically connected to the touch motherboard controller 400 through a second serial peripheral interface.

Correspondingly, S104 of providing a touch driving signal to the first to-be-scanned driving channels corresponding to the $(i+1)^{th}$ frame and the second to-be-scanned driving channels corresponding to the $(i+1)^{th}$ frame may include the following steps: scanning the first to-be-scanned driving channels corresponding to the $(i+1)^{th}$ frame and the second to-be-scanned driving channels corresponding to the $(i+1)^{th}$ frame, and setting the driving channels driven by the driving unit through the second serial peripheral interface, so that the driving unit provides the touch driving signal to the first to-be-scanned driving channels corresponding to the $(i+1)^{th}$ frame and the second to-be-scanned driving channels corresponding to the $(i+1)^{th}$ frame.

The specially designed second serial peripheral interface is used for setting the driving channels driven by the driving unit. In addition to setting the driving channels driven by the driving unit, the second serial peripheral interface may also be used for initializing the driving unit.

Figure 9:
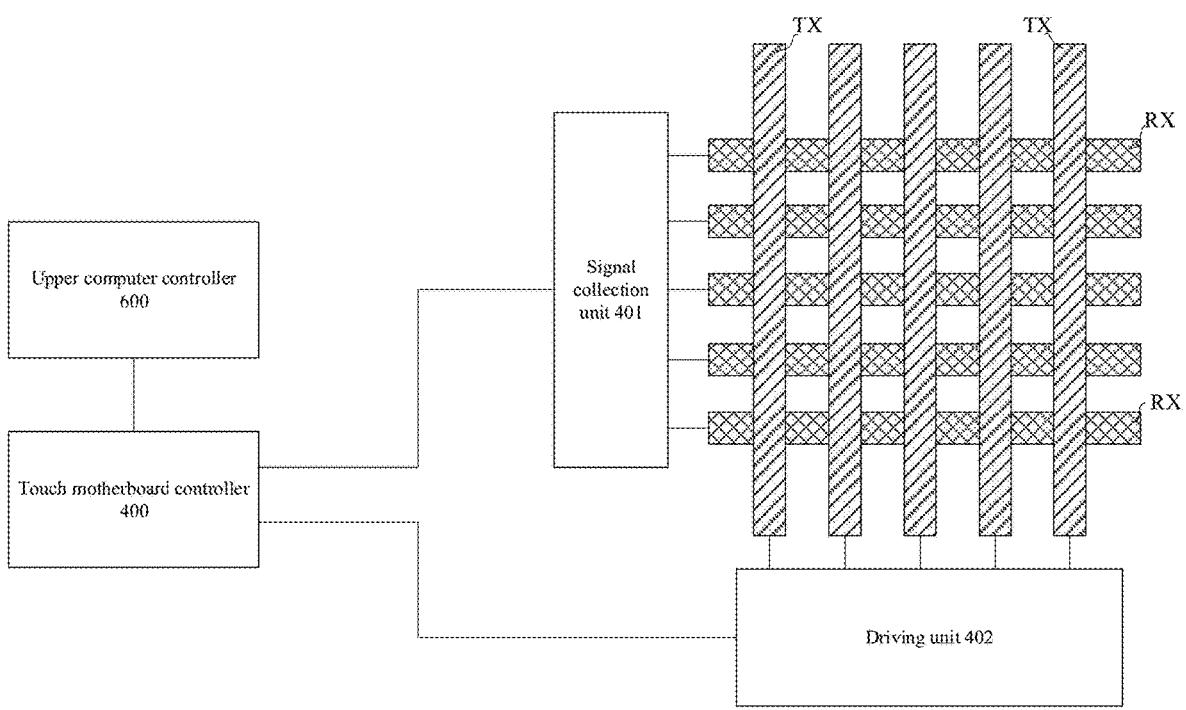
FIG. 9 is a schematic view of another circuit connection of the touch display screen provided in an embodiment of the present application.

FIG. 9 is another schematic view of circuit connection of the touch display screen provided in an embodiment of the present application. As shown in FIG. 9, according to some embodiments of the present application, optionally, the touch motherboard controller 400 may be electrically connected to an upper computer controller 600. In some examples, the upper computer controller 600 may be a main controller of a touch display device where the touch display screen is located, such as a main controller that controls an operating system (Windows operating system or Android operating system) to operate, which is not limited by embodiments of the present application.

FIG. 10 is another schematic flowchart of the scanning control method for the touch display screen provided in an embodiment of the present application. As shown in FIG. 10, correspondingly, after S103, the scanning control method for the touch display screen provided in embodiments of the present application may further include step S1001: sending first sensing data and second sensing data to the upper computer controller. The first sensing data includes sensing data of a plurality of receiving channels corresponding to the first to-be-scanned driving channels, and the second sensing data includes sensing data of a plurality of receiving channels corresponding to the second to-be-scanned driving channels.

After receiving the first sensing data and the second sensing data, the upper computer controller 600 may calculate the position of a touch point on the touch display screen according to the first sensing data and the second sensing data. That is, in some embodiments of the present application, the work of the touch motherboard controller 400 can be reduced, and some work (such as determining the position of the touch point) can be executed by the upper computer controller 600. When the upper computer controller 600 calculates the position of the touch point, the touch motherboard controller 400 controls the scanning and data collection of the next frame, thereby achieving complete concurrent operation of data processing and data collection.

In some specific embodiments, optionally, S1001 of sending first sensing data and second sensing data to the upper computer controller may include the following step:

sending the first sensing data and the second sensing data to the upper computer controller in a bulk transfer mode.

The bulk transfers are also known as batch transfers. That is, after the sensing data of the plurality of receiving channels corresponding to all the to-be-scanned driving channels (including the first to-be-scanned driving channels and the second to-be-scanned driving channels) in each frame are collected and sorted, the touch motherboard controller 400 sends the sensing data of the plurality of receiving channels corresponding to all the to-be-scanned driving channels in each frame to the upper computer controller 600. Compared to HID protocol transfers, the bulk transfers significantly improve the transfer speed and transfer efficiency of data.

In some embodiments, optionally, after the touch motherboard controller 400 sends the sensing data of the plurality of receiving channels corresponding to all the to-be-scanned driving channels in each frame to the upper computer controller 600 in the bulk transfer mode, the touch motherboard controller 400 can immediately issue a command to activate the driving unit and the signal collection unit to start data collection of the next frame. The data transmission and processing of the upper computer controller 600 do not need to occupy the computing resources of the touch motherboard controller 400.

Figure 11:
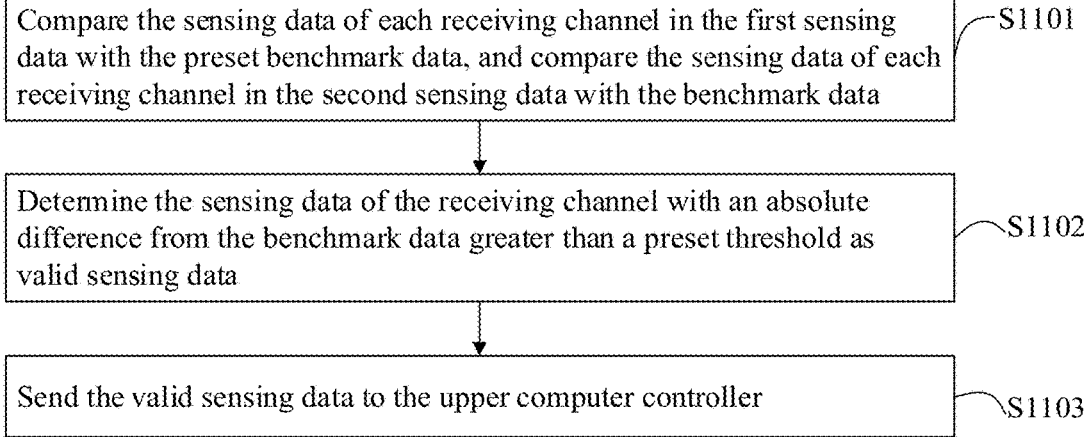
FIG. 11 is a schematic flowchart of S1001 in the scanning control method for the touch display screen provided in an embodiment of the present application.

FIG. 11 is a schematic flowchart of S1001 in the scanning control method for the touch display screen provided in an embodiment of the present application. As shown in FIG. 11, according to some embodiments of the present application, optionally, S1001 of sending first sensing data and second sensing data to the upper computer controller may include the following steps S1101 to S1103.

S1101: Compare the sensing data of each receiving channel in the first sensing data with the preset benchmark data, and compare the sensing data of each receiving channel in the second sensing data with the benchmark data.

As mentioned above, the benchmark data may be determined according to the sensing data of the receiving channels RX when not touched. The preset threshold may be flexibly adjusted according to the actual situation, and is not limited by embodiments of the present application.

S1102: Determine the sensing data of the receiving channel with an absolute difference from the benchmark data greater than a preset threshold as valid sensing data.

In S1102, the sensing data of the receiving channel with the absolute difference from the benchmark data greater than the preset threshold among the first sensing data and the second sensing data may be determined as valid sensing data.

S1103: Send the valid sensing data to the upper computer controller.

In this way, only valid sensing data is sorted and selected for the sensing data collected each time. Because the valid sensing data is generated only during touch or other signal fluctuations, the data transmission volume is greatly reduced and the transmission efficiency is improved.

According to some embodiments of the present application, optionally, S1103 of sending the valid sensing data to the upper computer controller may include the following steps: compressing the valid sensing data into a preset format, and then sending the compressed valid sensing data to the upper computer controller.

The valid sensing data is compressed into the preset format, and then the compressed valid sensing data is sent to the upper computer controller, which can further reduce the data transmission volume and further improve the transmission efficiency.

In some specific embodiments, optionally, compressing the valid sensing data into a preset format may include the following: storing position information of the driving channel corresponding to each valid sensing data, position information of the receiving channel corresponding to each valid sensing data, and a value of each valid sensing data to a buffer of data frames according to three bytes, to obtain a target data frame including the valid sensing data.

Table 1 illustrates the target data frame including the valid sensing data.

frame may include a plurality of valid sensing data, each valid sensing data may be expressed in three bytes and stored in the buffer of transmitted data frames, the first byte may be the ID of the driving channel, the second byte may be the ID of the receiving channel, and the third byte may be the value of the valid sensing data.

Correspondingly, sending the compressed valid sensing data to the upper computer controller may include the following step: sending the target data frame to the upper computer controller. In some embodiments of the present application, the above data sorting and compression algorithm may be performed simultaneously with sensing data collection and performed after each channel data collection and before next channel data collection, that is, simultaneously with the sensing data collection of the current frame, without affecting the collection time of each frame.

Correspondingly, after receiving the target data frame, the upper computer controller can parse the packaged valid sensing data using a reverse algorithm of the data sorting and compression algorithm. After the packaged valid sensing data is restored to the valid sensing data, the upper computer controller can calculate the position of the touch point on the touch display screen based on a preset touch core algorithm and the valid sensing data. At this time, the touch motherboard controller is collecting the next frame of data. After obtaining the processing result, the upper computer controller can report the position of the touch point and receive the next frame of valid sensing data, thereby achieving complete concurrent operation of data processing and data collection.

For ease of understanding, the scanning control method for the touch display screen will be illustrated below in conjunction with some application embodiments.

For example, an 86-inch touch display screen includes 120 driving channels and 216 receiving channels. The valid sampling time for one driving channel to sample all receiving channels is 90 ns, of which the scanning time for one driving channel is 50 ns, and the sensing data transmission of the plurality of receiving channels corresponding to one driving channel requires 40 ns. A frame of time in the solution of related technologies is 120*90=10.8 ms, and the scanning frame rate is 1000/10.8~90 frames per second.

Based on the scanning control method for the touch display screen in embodiments of the present application, in the case of a single touch pen, it is assumed that the touch pen occupies 3 driving channels, 8 channels are expanded on each of left and right sides, and 10 channels are scanned in rounds. Then, the number of channels scanned per frame is

| Byte | 0 | 1 | 2 | 3 | 4 | 5 | 6 | ... | 17 | 18 | 19 | ... |
|---|---|---|---|---|---|---|---|---|---|---|---|---|
| Definition of data bit | | Packet marking | Packet length (low byte) | | Packet length (high byte) | Number of valid sensing data (low byte) | Number of valid sensing data (high byte) | | Driving channel ID | Receiving channel ID | Value | |
| Explanation | | | | Packet header | | | | | Valid sensing data 1 | | Valid sensing data n | |

As shown in Table 1, in some examples, the position information of the driving channel corresponding to each valid sensing data is used for representing the position of the driving channel, such as the number (ID) of the driving channel; and the position information of the receiving channel corresponding to each valid sensing data is used for representing the position of the receiving channel, such as the number (ID) of the receiving channel. The target data 3+8*2+10=29, a frame of time is 29*90=2.61 ms, the scanning frame rate is 1000/2.61>300 frames per second and reaches more than 300 frames per second for a single touch point, and the frame of time is reduced from about 10 ms to about 3 ms, which improves product quality, greatly shortens the scanning time for the touch display screen in each frame, reduces the scanning data for the touch display screen in each frame, improves the scanning frame rate and response speed of the touch display screen, and enhances user experience.

According to some embodiments of the present application, optionally, S802 of receiving sensing data from the plurality of receiving channels may include the following step:

when the driving unit provides a touch driving signal to the $j^{th}$ driving channel, receiving sensing data of the plurality of receiving channels corresponding to the $(j-1)^{th}$ driving channel sent by the signal collection unit.

That is, in the scanning process of the $j^{th}$ driving channel (such as 50 ns), the signal collection unit 401 sends the sensing data of the plurality of receiving channels corresponding to the $(j-1)^{th}$ driving channel to the touch motherboard controller 400. In this way, if hardware allows, there is no need to reserve 40 ns of data transmission time. One driving channel only needs 50 ns to complete sampling, and theoretical frame rate can reach over 600 frames per second.

In addition, the inventor of the present application found through research that, due to mass sensing data of the touch display screen, upper computer signal display software is limited by data transmission, resulting in display pause and insufficient response. In embodiments of the present application, the faster bulk transfers and the more efficient and simplest valid data compression mode greatly shorten or reduce the time and quantity of signal transmission, make the response of the display software faster and more accurate, greatly improve the response speed of the signal display software, and improve the efficiency of research, development, production, and use of the display software.

Based on the scanning control method for the touch display screen provided in the above embodiments, embodiments of the present application further provide a scanning control system for a touch display screen.

As shown in FIG. 9, the touch display screen may include a plurality of driving channels TX, and the scanning control system for the touch display screen may include:

a driving unit 402; and a touch motherboard controller 400, where the touch motherboard controller 400 is electrically connected to the plurality of driving channels TX through the driving unit 402, and the touch motherboard controller is configured to perform the steps of the scanning control method for the touch display screen provided in the above method embodiments.

According to the scanning control system for the touch display screen in embodiments of the present application, full area scanning of the touch display screen is changed to dynamic scanning, that is, only the first driving channel with the touch signal and the N driving channels adjacent to the first driving channel (namely, the first to-be-scanned driving channels) are scanned, an unselected driving channel combination is selected as second to-be-scanned driving channels, and the remaining driving channels in the touch display screen except the first to-be-scanned driving channels are scanned in rounds, thereby shortening scanning time for the touch display screen in each frame, reducing scanning data for the touch display screen in each frame, improving the scanning frame rate and response speed of the touch display screen, and enhancing user experience.

As shown in FIG. 9, according to some embodiments of the present application, optionally, the touch motherboard controller 400 may be electrically connected to an upper computer controller 600. The touch motherboard controller 400 may be further configured to send first sensing data and second sensing data to the upper computer controller, where the first sensing data includes sensing data of a plurality of receiving channels corresponding to first to-be-scanned driving channels, and the second sensing data includes sensing data of a plurality of receiving channels corresponding to second to-be-scanned driving channels. The upper computer controller 600 may be configured to calculate the position of a touch point on the touch display screen according to the first sensing data and the second sensing data.

After receiving the first sensing data and the second sensing data, the upper computer controller 600 may calculate the position of a touch point on the touch display screen according to the first sensing data and the second sensing data. That is, in some embodiments of the present application, the work of the touch motherboard controller 400 can be reduced, and some work (such as determining the position of the touch point) can be executed by the upper computer controller 600. When the upper computer controller 600 calculates the position of the touch point, the touch motherboard controller 400 controls the scanning and data collection of the next frame, thereby achieving complete concurrent operation of data processing and data collection.

As shown in FIG. 9, according to some embodiments of the present application, optionally, the touch display screen may further include a plurality of receiving channels RX, which intersect with and are insulated from the plurality of driving channels TX. The scanning control system for the touch display screen in embodiments of the present application may further include a signal collection unit 401, the plurality of receiving channels RX may be electrically connected to the touch motherboard controller 400 through the signal collection unit 401, and the signal collection unit 401 may be configured to collect sensing data of the plurality of receiving channels RX.

The connection relationship and function of each module/unit in the scanning control system for the touch display screen shown in FIG. 9 are the same as those in the above method embodiments, are described in detail in the method embodiments, can achieve corresponding technical effects, and will not be repeated here for the sake of simplicity.

Based on the scanning control method for the touch display screen provided in the above embodiments, the present application further provides a specific implementation of a touch display device. Refer to the following embodiment.

Figure 12:
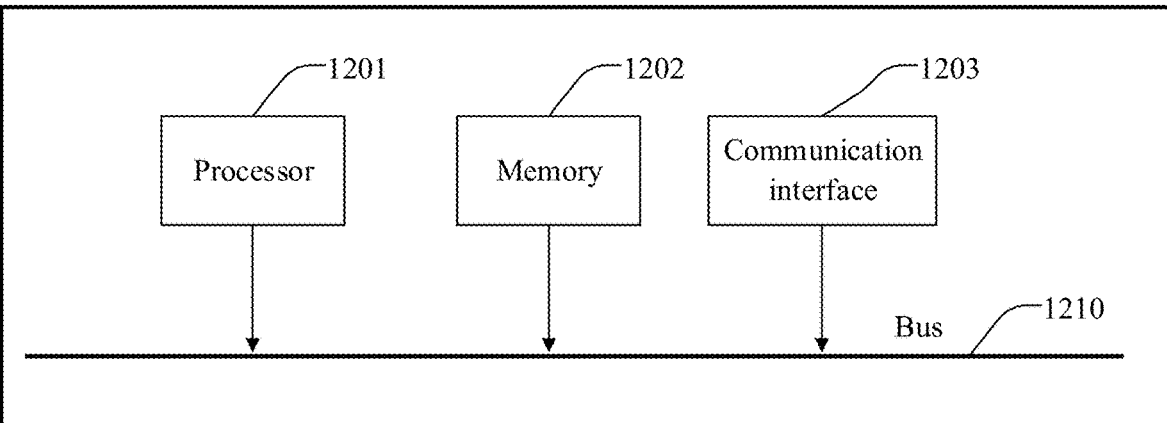
FIG. 12 is a schematic view of a hardware structure of a touch display device provided in an embodiment of the present application.

FIG. 12 is a schematic view of a hardware structure of a touch display device provided in an embodiment of the present application.

The touch display device may include a processor 1201 and a memory 1202 storing computer program instructions.

Specifically, the processor 1201 may include a central processing unit (CPU) or an application specific integrated circuit (ASIC), or may be configured to implement one or more integrated circuits in embodiments of the present application.

The memory 1202 may include a mass memory for data or instructions. By way of example and not limitation, the memory 1202 may be a hard disk drive (HDD), a floppy disk drive, a flash memory, an optical disk, a magneto-optical disk, a magnetic tape, or a universal serial bus (USB) drive, or a combination of two or more of these. In one example, the memory 1202 may include removable or non-removable (or fixed) media, or the memory 1202 may be a non-volatile solid-state memory. The memory 1202 may be inside or outside the touch display device.

In one example, the memory 1202 may be a read only memory (ROM). In one example, the ROM may be a mask-programmed ROM, a programmable ROM (PROM), an erasable PROM (EPROM), an electrically erasable PROM (EEPROM), an electrically alterable ROM (EAROM), a flash memory, or a combination of two or more of these.

The memory 1202 may include read-only memories (ROM), random access memories (RAM), magnetic disk storage medium devices, optical storage medium devices, flash memory devices, and electrical, optical, or other physical/tangible memory storage devices. Therefore, typically, the memory includes one or more tangible (non-transient) computer-readable storage media (such as memory devices) encoded with software including computer executable instructions, and when the software is executed (for example, by one or more processors), it can perform the operation described with reference to the method according to one aspect of the present application.

The processor 1201 reads and executes the computer program instructions stored in the memory 1202 to implement the method/steps S101 to S105 in embodiment shown in FIG. 2, and to achieve the corresponding technical effects achieved by executing the method/steps in the embodiment shown in FIG. 2. For the sake of simplicity, details will not be repeated here.

In one example, the touch display device may further include a communication interface 1203 and a bus 1210. As shown in FIG. 12, the processor 1201, the memory 1202, and the communication interface 1203 are connected and communicate with each other through the bus 1210.

The communication interface 1203 is mainly configured to implement communication between various modules, apparatuses, units, and/or devices in embodiments of the present application.

The bus 1210 includes hardware, software, or both, and couples the components of the touch display device together. By way of example and not limitation, the bus may be an accelerated graphics port (AGP) or other graphics bus, an extended industry standard architecture (EISA) bus, a front side bus (FSB), a hyper transport (HT) interconnect, an industry standard architecture (ISA) bus, an infinite bandwidth interconnect, a low pin count (LPC) bus, a memory bus, a microchannel architecture (MCA) bus, a peripheral component interconnect (PCI) bus, a PCI-Express (PCI-X) bus, a serial advanced technology attachment (SATA) bus, a video electronics standards association local (VLB) bus, or any other suitable bus, or a combination of two or more of the above. Where appropriate, the bus 1210 may include one or more buses. Although embodiment of the present application describes and shows a specific bus, the present application considers any suitable bus or interconnect.

Moreover, in conjunction with the scanning control method for the touch display screen in the aforementioned embodiments, an embodiment of the present application may provide a computer-readable storage medium for implementation. The computer-readable storage medium stores computer program instructions; and when the computer program instructions are executed by a processor, any scanning control method for a touch display screen in the aforementioned embodiments is implemented. Examples of the computer-readable storage medium include non-transient computer-readable storage media, such as an electronic circuit, a semiconductor memory device, an ROM, a random access memory, a flash memory, an erasable ROM (EROM), a floppy disk, a CD-ROM, an optical disk, and a hard disk.

It should be clear that the present application is not limited to the specific configuration and processing described above and shown in the drawings. For the sake of simplicity, detailed descriptions of known methods are omitted here. In the aforementioned embodiments, several specific steps are described and shown as examples. However, the method process of the present application is not limited to the specific steps described and shown. After understanding the gist of the present application, a person skilled in the art can make various changes, modifications and additions, or change the order between the steps.

The functional blocks shown in the above structural block view can be implemented as hardware, software, firmware, or a combination thereof. When implemented in hardware, the functional blocks may be, for example, electronic circuits, application specific integrated circuits (ASIC), appropriate firmware, plug-ins, or function cards. When implemented in software, the elements of the present application are programs or code segments used to perform required tasks. The programs or code segments may be stored in a machine-readable medium, or transmitted over a transmission medium or communication link through data signals carried in carrier waves. The "machine-readable medium" may include any medium that can store or transmit information. Examples of the machine-readable medium include an electronic circuit, a semiconductor memory device, an ROM, a flash memory, an erasable ROM (EROM), a floppy disk, a CD-ROM, an optical disk, a hard disk, an optical fiber medium, a radio frequency (RF) link, etc. The code segments may be downloaded via a computer network such as the Internet and Intranet.

It should also be noted that the exemplary embodiments mentioned in the present application describe some methods or systems based on a series of steps or devices. However, the present application is not limited to the order of the above steps, that is, the steps may be performed in the order mentioned in embodiments or in an order different from that in embodiments, or several steps may be performed simultaneously.

The above describes various aspects of the present application with reference to the flowchart and/or block diagram of the method, apparatus (system), and computer program product according to embodiments of the present application. It should be understood that each box in the flowchart and/or block view and a combination of boxes in the flowchart and/or block view can be implemented by computer program instructions. These computer program instructions can be provided to a processor of a general-purpose computer, a dedicated computer, or other programmable data processing apparatuses to produce a machine, which enables the instructions executed by the processor of the computer or other programmable data processing apparatuses to implement the functions/actions specified in one or more boxes of the flowchart and/or block view. Such a processor may be, but is not limited to a general-purpose processor, a dedicated processor, a special application processor, or a field programmable logic circuit. It can also be understood that each box in the block view and/or flowchart and a combination of boxes in the block view and/or flowchart can be implemented by dedicated hardware that executes specified functions or actions, or by a combination of dedicated hardware and computer instructions.

Described above are merely specific implementations of the present application. A person skilled in the art can clearly understand that, for the sake of convenience and briefness in description, the specific working processes of the above-described systems, modules and units may refer to the corresponding processes in embodiments of the aforementioned methods, and details are not described herein again. It should be understood that the protection scope of the present application is not limited thereto. A person skilled in the art can readily conceive various equivalent modifications or replacements within the technical scope disclosed by the present application, and these modifications or replacements shall fall within the protection scope of the present application.

What is claimed is:

1. A scanning control method for a touch display screen, comprising:

determining a first driving channel where a touch signal is detected and N driving channels adjacent to the first driving channel as first to-be-scanned driving channels, wherein the first driving channel is any one or more driving channels among a plurality of driving channels, and N is a positive integer;

selecting an unselected driving channel combination as second to-be-scanned driving channels, wherein the driving channel combination comprises at least one adjacent driving channel except the first to-be-scanned driving channels, and driving channels comprised by different driving channel combinations are not all the same;

providing a touch driving signal to the first to-be-scanned driving channels and the second to-be-scanned driving channels and obtaining a touch signal;

if a target driving channel where the touch signal is detected is inconsistent with the first driving channel, updating the target driving channel as the first driving channel; and if the target driving channel where the touch signal is detected is consistent with the first driving channel, continuing to select an unselected driving channel combination as the second to-be-scanned driving channels until there are no unselected driving channel combinations, wherein the selecting an unselected driving channel combination as second to-be-scanned driving channels comprises:

dividing the driving channels except the first to-be-scanned driving channels into a plurality of driving channel combinations in ascending order of distances from the first to-be-scanned driving channels; and sequentially selecting an unselected driving channel combination as the second to-be-scanned driving channels in order of arrangement of the driving channel combinations.

2. The scanning control method for the touch display screen according to claim 1, wherein the selecting an unselected driving channel combination as second to-be-scanned driving channels comprises:

sequentially selecting an unselected driving channel combination as the second to-be-scanned driving channels in order of arrangement of the driving channels.

3. The scanning control method for the touch display screen according to claim 2, wherein different driving channel combinations each comprise the same number of driving channels;

the sequentially selecting an unselected driving channel combination as the second to-be-scanned driving channels in order of arrangement of the driving channels comprises:

dividing the driving channels except the first to-be-scanned driving channels into a plurality of driving channel combinations in order of arrangement of the driving channels; and sequentially selecting an unselected driving channel combination as the second to-be-scanned driving channels in order of arrangement of the driving channel combinations.

4. The scanning control method for the touch display screen according to claim 3, wherein if the target driving channel where the touch signal is detected is consistent with the first driving channel, the continuing to select an unselected driving channel combination as the second to-be-scanned driving channels until there are no unselected driving channel combinations comprises:

if the target driving channel where the touch signal is detected is consistent with the first driving channel, continuing to select an unselected driving channel combination as the second to-be-scanned driving channels until the driving channel combination comprises the last driving channel.

5. The scanning control method for the touch display screen according to claim 1, wherein the number of driving channels comprised by different driving channel combinations sequentially increases in order of arrangement of the driving channel combinations;

the second driving channel combination comprises driving channels in the first driving channel combination; the second driving channel combination is adjacent to and behind the first driving channel combination in terms of the order of arrangement of the driving channel combinations.

6. The scanning control method for the touch display screen according to claim 1, wherein before determining a first driving channel where a touch signal is detected and N driving channels adjacent to the first driving channel as first to-be-scanned driving channels, the scanning control method for the touch display screen further comprises:

obtaining sensing data corresponding to each driving channel;

comparing the sensing data corresponding to each driving channel with preset benchmark data;

determining the sensing data corresponding to the driving channel with an absolute difference from the benchmark data greater than a preset threshold as valid sensing data; and designating the valid sensing data as a touch signal.

7. The scanning control method for the touch display screen according to claim 6, wherein during the step of providing a touch driving signal to the first to-be-scanned driving channels and the second to-be-scanned driving channels and obtaining a touch signal, the first to-be-scanned driving channel and the second to-be-scanned driving channel are determined simultaneously.

8. The scanning control method for the touch display screen according to claim 1, wherein after providing a touch driving signal to the first to-be-scanned driving channels and the second to-be-scanned driving channels and obtaining a touch signal, the scanning control method for the touch display screen further comprises:

sending first sensing data and second sensing data to an upper computer controller, so that the upper computer controller calculates a position of a touch point on the touch display screen according to the first sensing data and the second sensing data, wherein the first sensing data comprises sensing data of a plurality of receiving channels corresponding to the first to-be-scanned driving channels, and the second sensing data comprises sensing data of a plurality of receiving channels corresponding to the second to-be-scanned driving channels.

9. The scanning control method for the touch display screen according to claim 8, wherein the sending first sensing data and second sensing data to an upper computer controller comprises:

sending the first sensing data and the second sensing data to the upper computer controller in a bulk transfer mode.

10. The scanning control method for the touch display screen according to claim 8, wherein before the sending first sensing data and second sensing data to an upper computer controller, the scanning control method for the touch display screen further comprises:

obtaining first sensing data and second sensing data, and simultaneously compressing the first sensing data and the second sensing data in a preset format.

11. A scanning control system for a touch display screen, comprising:

a driving unit; and a touch motherboard controller, wherein the touch motherboard controller is electrically connected to a plurality of driving channels through the driving unit, and the touch motherboard controller is configured to perform the scanning control method for the touch display screen according to claim 1, divide the driving channels except the first to-be-scanned driving channels into a plurality of driving channel combinations in ascending order of distances from the first to-be-scanned driving channels, and sequentially select an unselected driving channel combination as the second to-be-scanned driving channels in order of arrangement of the driving channel combinations.

12. The scanning control system for the touch display screen according to claim 11, wherein the touch motherboard controller is configured to sequentially select an unselected driving channel combination as the second to-be-scanned driving channels in order of arrangement of the driving channels.

13. The scanning control system for the touch display screen according to claim 12, wherein the touch motherboard controller is configured to divide the driving channels except the first to-be-scanned driving channels into a plurality of driving channel combinations in order of arrangement of the driving channels and sequentially select an unselected driving channel combination as the second to-bescanned driving channels in order of arrangement of the driving channel combinations.

14. The scanning control system for the touch display screen according to claim 13, wherein if the target driving channel where the touch signal is detected is consistent with the first driving channel, the touch motherboard controller is configured to continue to select an unselected driving channel combination as the second to-be-scanned driving channels until the driving channel combination comprises the last driving channel.

15. The scanning control system for the touch display screen according to claim 11, wherein the touch motherboard controller is electrically connected to an upper computer controller, and the touch motherboard controller is further configured to: send first sensing data and second sensing data to the upper computer controller, the first sensing data comprising sensing data of a plurality of receiving channels corresponding to a first to-be-scanned driving channels, and the second sensing data comprising sensing data of a plurality of receiving channels corresponding to a second to-be-scanned driving channels; and the upper computer controller is configured to calculate a position of a touch point on the touch display screen according to the first sensing data and the second sensing data.

16. The scanning control system for the touch display screen according to claim 11, wherein the touch display screen further comprises a plurality of receiving channels, which intersect with and are insulated from the plurality of driving channels; and the scanning control system for the touch display screen further comprises a signal collection unit, the plurality of receiving channels are electrically connected to the touch motherboard controller through the signal collection unit, and the signal collection unit is configured to collect sensing data of the plurality of receiving channels.

17. A touch display device, comprising: a processor, a memory, and a computer program stored in the memory and executable by the processor, wherein the computer program, when executed by the processor, causes the steps of the scanning control method for the touch display screen according to claim 1 to be implemented.

18. A non-transitory computer-readable storage medium, storing a computer program that, when executed by a processor, causes the steps of the scanning control method for the touch display screen according to claim 1 to be implemented.

* * * * *